United States Patent
Robert et al.

(10) Patent No.: US 9,496,618 B2
(45) Date of Patent: *Nov. 15, 2016

(54) PROCESS FOR MANUFACTURING AN ANTENNA FOR AN ELECTRONIC DEVICE IN A TYRE

(75) Inventors: Michel Robert, Clermont-Ferrand (FR); Jay Clifford Sinnet, Greenville, SC (US)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 200 days.

This patent is subject to a terminal disclaimer.

(21) Appl. No.: 13/816,014

(22) PCT Filed: Aug. 10, 2011

(86) PCT No.: PCT/FR2011/051900
§ 371 (c)(1),
(2), (4) Date: Apr. 11, 2013

(87) PCT Pub. No.: WO2012/020203
PCT Pub. Date: Feb. 16, 2012

(65) Prior Publication Data
US 2013/0185929 A1    Jul. 25, 2013

(30) Foreign Application Priority Data
Aug. 11, 2010  (FR) ...................................... 10 56568

(51) Int. Cl.
*H01Q 1/40* (2006.01)
*H01Q 11/08* (2006.01)
*G06K 19/077* (2006.01)
*H01Q 1/22* (2006.01)
(Continued)

(52) U.S. Cl.
CPC ......... *H01Q 11/08* (2013.01); *G06K 19/07764* (2013.01); *G06K 19/07773* (2013.01); *H01Q 1/2241* (2013.01); *H01Q 1/362* (2013.01); *H01Q 9/26* (2013.01); *H01Q 11/083* (2013.01); *Y10T 29/49016* (2015.01)

(58) Field of Classification Search
CPC .. H01P 3/165; H01P 11/001; B60C 23/0493; H01Q 1/2241; B29D 2030/0072
USPC ......... 29/600, 861, 592.1; 343/700 MS, 873, 343/895

See application file for complete search history.

(56) References Cited

U.S. PATENT DOCUMENTS 3,772,772 A * 11/1973 Lehnert ........................... 29/600
4,001,898 A *  1/1977 Caveney .................... 24/16 PB
(Continued)

FOREIGN PATENT DOCUMENTS

CN          1099320 A      3/1995
CN          1915647 A      2/2007
(Continued)

*Primary Examiner* — Minh Trinh
(74) *Attorney, Agent, or Firm* — Fitzpatrick, Cella, Harper & Scinto

(57) ABSTRACT

During a process for manufacturing an antenna, which includes a core of filiform shape and which is intended to be integrated into a rubber compound of a tyre, the core is coated with a coating made of a material different from a material of the core. After the core is coated, at least one portion of the coated core is plastically deformed.

20 Claims, 2 Drawing Sheets

(51) Int. Cl.
*H01Q 9/26* (2006.01)
*H01Q 1/36* (2006.01)

(56) References Cited

U.S. PATENT DOCUMENTS

| | | | | |
|---|---|---|---|---|
| 4,791,241 | A | * | 12/1988 | Ando et al. .................. 174/125.1 |
| 4,791,242 | A | * | 12/1988 | Gatti ........................... 174/40 R |
| 5,836,066 | A | * | 11/1998 | Ingram ........................... 29/90.7 |
| 5,861,577 | A | * | 1/1999 | Tamura et al. ............. 174/50.56 |
| 6,147,660 | A | * | 11/2000 | Elliott ............................ 343/895 |
| 6,217,683 | B1 | | 4/2001 | Balzer et al. ..................... 156/60 |
| 6,257,683 | B1 | | 7/2001 | Yang ............................... 312/333 |
| 6,449,841 | B1 | * | 9/2002 | Endo et al. ....................... 29/861 |
| 6,452,569 | B1 | * | 9/2002 | Park et al. ..................... 343/895 |
| 6,788,192 | B2 | | 9/2004 | Shimura ......................... 340/447 |
| 7,151,495 | B2 | | 12/2006 | Strache et al. ................. 343/713 |
| 7,373,713 | B2 | | 5/2008 | Forster et al. ................... 29/600 |
| 7,375,699 | B2 | | 5/2008 | Forster et al. ................. 343/806 |
| 7,453,407 | B2 | | 11/2008 | Logan et al. ................... 343/711 |
| 8,226,783 | B2 | | 7/2012 | Shimura ........................... 156/60 |
| 8,776,590 | B2 | | 7/2014 | Kempf et al. ............... 731/146.5 |
| 2001/0056232 | A1 | * | 12/2001 | Lardo et al. ................... 600/423 |
| 2002/0029626 | A1 | | 3/2002 | Koch et al. ....................... 73/120 |
| 2003/0221766 | A1 | | 12/2003 | Strache et al. ................. 156/123 |
| 2004/0032377 | A1 | | 2/2004 | Forster et al. ................. 343/895 |
| 2004/0189456 | A1 | | 9/2004 | Myatt ............................. 340/445 |
| 2008/0142150 | A1 | | 6/2008 | Robert ............................ 156/117 |
| 2008/0158072 | A1 | | 7/2008 | Logan et al. ................... 343/711 |
| 2009/0277559 | A1 | | 11/2009 | Kuriya ............................ 152/548 |
| 2012/0080527 | A1 | * | 4/2012 | Finn ................... G06K 19/07722 235/492 |
| 2012/0305151 | A1 | | 12/2012 | Robert ......................... 152/152.1 |
| 2013/0194157 | A1 | * | 8/2013 | Robert et al. .................. 343/873 |

FOREIGN PATENT DOCUMENTS

| | | |
|---|---|---|
| CN | 201532644 U | 7/2010 |
| EP | 0 608 466 A1 | 4/1993 |
| EP | 1 454 770 A1 | 9/2004 |
| EP | 1 942 445 A1 | 7/2008 |
| JP | 4-179003 A | 6/1992 |
| JP | 11-042915 A | 2/1999 |
| JP | H11-289207 A | 10/1999 |
| JP | 2003-152427 A | 5/2003 |
| JP | 2004-007663 A | 1/2004 |
| JP | 2005-260432 A | 9/2005 |
| JP | 2006-507967 A | 3/2006 |
| JP | 2006-514462 A | 4/2006 |
| JP | 2008-141653 A | 6/2008 |
| JP | 2008-167448 A | 7/2008 |
| JP | 2010-050895 A | 3/2010 |
| WO | WO 03/105511 A1 | 12/2003 |
| WO | WO 2004/070876 A1 | 8/2004 |
| WO | WO 2006/059579 A1 | 6/2006 |

\* cited by examiner

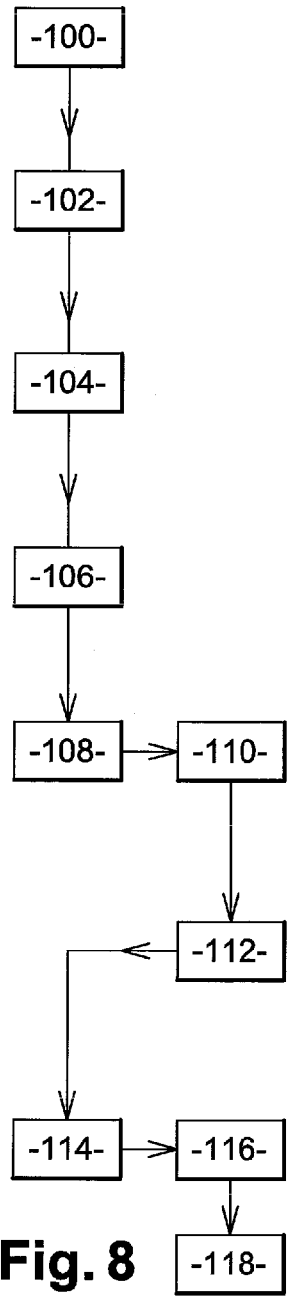
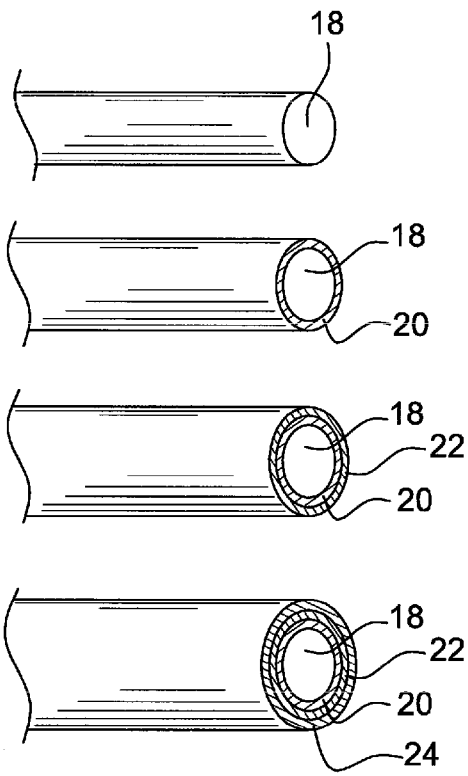
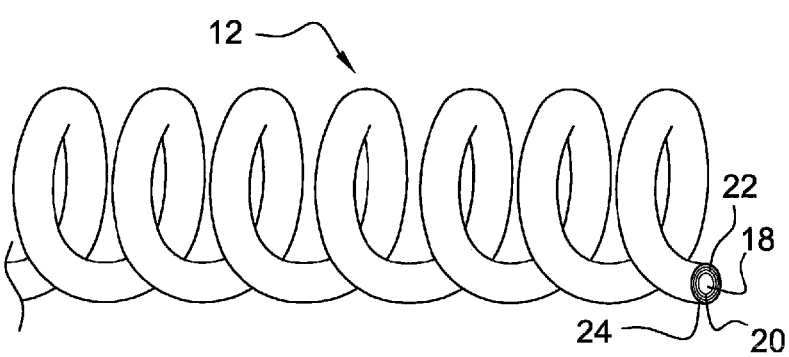
Fig. 3
Fig. 4
Fig. 5
Fig. 6
Fig. 7
Fig. 8

PROCESS FOR MANUFACTURING AN ANTENNA FOR AN ELECTRONIC DEVICE IN A TYRE

FIELD OF THE INVENTION

The invention relates to the field of electronic devices for tyres.

BACKGROUND

An electronic device comprising two antennas connected to an electronic member, for example a chip, said electronic member being mounted on a support plate, is known from the prior art. Each antenna has a substantially helical shape. Each antenna comprises a steel core coated directly with a brass coating, brass being an alloy of copper and zinc in respective proportions of around 75% and 25%.

It is known that the electromagnetic conduction for such an antenna takes place mainly through the skin effect, that is to say electromagnetic conduction takes place mainly in the outer layers of the antenna. The skin depth depends especially on the frequency of the radiation and of the constituent material of the conduction layer. To give an example, for a UHF frequency (for example 915 MHz), the skin depth is 2.1 μm for silver, 2.2 μm for copper and 4.4 μm for brass.

To manufacture the antenna, a bare filiform core unwound from a storage reel is formed by plastically deforming it so as to give it a helical shape. Next, the helical core is cut into sections and the bare helical core is coated with the brass coating. The coating step is carried out in an electrolysis bath.

As recalled above, for optimum operation of a brass-coated antenna at UHF frequencies, the thickness of the coating layer must not be less than 4 microns. Furthermore, because of the helical geometry of the core, the conditions for coating it are very difficult to control, especially inside the turns. Moreover, since it is made of an alloy, its precise composition is difficult to control and requires precise regulation of the parameters of the deposition process (currents, time through the bath, composition of the bath). To summarize, the quality of the deposit, together with the necessary thicknesses, results in a relatively long production time which has a major consequence on the cost aspect of the product.

BRIEF DESCRIPTION OF THE INVENTION

The object of the invention is to provide an industrially robust and lower-cost process enabling an antenna having optimum characteristics to be obtained.

To meet this objective, one subject of the invention is a process for manufacturing an antenna comprising a core, the antenna being intended to be integrated into a rubber compound of a tyre, wherein:
the core of filiform shape is coated with a coating of a material different from the material of the core; and
after the coating step, at least one portion of the coated core is plastically deformed.

By coating the core before its plastic deformation, that is to say when the core still has a filiform shape, the efficiency of the coating step is improved. This is because, since the core has a filiform shape, the coating may cover the bare core uniformly and homogeneously. Thus, the coating step is relatively rapid, thereby enabling the thickness of each layer to be limited and the energy costs of the coating step to be reduced, while still improving the quality of the coating. The antenna thus obtained is therefore functional.

Furthermore, the process is continuous, that is to say the coating step makes it possible to cover a great length of filiform core which will then be cut to length. Thus, the process according to the invention makes it possible to reduce manual intervention and therefore costs.

A substantially pure metal is a metal comprising said metal in a proportion greater than 95%, the at most remaining 5% merely constituting impurities associated with the process for manufacturing the metal.

It is to be quoted that an alloy of metals is usually made for its greater part of at least two different metals, that is to say constituting together more than 50% in weight of the alloy, and additives providing the alloy with specific properties according to its use;

According to certain optional features of the process:
the core is made of steel;
the portion of the coated core is plastically deformed so as to give it a helical shape. The antenna is intended to be integrated into a rubber compound of a tyre. During operation of the tyre, the latter undergoes stresses and strains that are transmitted to the antenna. The helical shape makes it possible to improve the endurance of the antenna with respect to the stresses to which the antenna is subjected. This is because the helical shape gives the antenna flexibility, enabling it to deform without risk of breaking, which could damage the tyre. In particular, the helical shape gives it elasticity in the direction parallel to the axis of the helix;
the core is coated with an electromagnetic-signal conduction layer. The conduction layer makes it possible, through the skin effect, to conduct an electromagnetic signal between the antenna and the electronics which is connected to it;
the conduction layer is made of a substantially pure metal, for example copper. The coating step has maximum efficiency when a substantially pure metal is used. Furthermore, copper is an excellent conductor, which helps to improve the conduction performance of the antenna. In addition, the action of coating the core with a coating made of a substantially pure metal, such as copper, makes it possible for the rate of manufacture of the antenna to be very substantially increased, practically by a factor that may be up to 10, compared with a process using a coating made of an alloy such as brass;
the core is coated directly with the conduction layer. As a variant, the bare core could be coated with one or more intermediate layers interposed between the bare core and the conduction layer. In another variant, the bare core could be coated with several conduction layers, each conduction layer being made of a substantially pure metal, for example copper. In this other variant, one of the conduction layers may coat the core directly or else an intermediate layer is interposed between the bare core and this conduction layer; and
the core is coated with a chemical isolation layer intended for chemically isolating the rubber from what the chemical isolation layer coats. The conduction layer may contain one or more materials that are incompatible with the rubber of the tyre or else that may react with this rubber. This would result both in deterioration of the conduction layer and of the rubber surrounding the antenna. This chemical isolation layer is chemically inert with respect to the rubber. The chemical isolation layer thus makes it possible to prevent chemical reactions between the conduction layer and the surrounding rubber. In particular, when the conduction layer is made of copper, the chemical isolation layer prevents sulphidation of the copper. In other words, the chemical isolation layer has the function of protecting the rubber and the layer that it coats. Thus, the use of layers having two separate functions, namely a conduction function and a chemical isolation function, makes it possible to optimize the thickness needed for each layer and therefore the costs associated with coating the core;

the chemical isolation layer is made of a substantially pure metal or an alloy of metals, for example chosen from zinc, nickel, tin and brass. The coating step has maximum efficiency when a substantially pure metal is used. Furthermore, these metals and brass are chemically inert with respect to the rubber and provide good adhesion of the chemical isolation layer to the conduction layer. Furthermore, in the case of zinc or nickel, they provide good adhesion of the chemical isolation layer to the rubber. Moreover, these metals and brass make it possible for the antenna to be easily connected to the electronic member, for example a chip, thanks to their solderability properties;

the conduction layer is coated directly with the chemical isolation layer. As a variant, the conduction layer may be coated with one or more intermediate layers interposed between the conduction layer and the chemical isolation layer. In another variant, the conduction layer may be coated with several chemical isolation layers, each chemical isolation layer being made of a substantially pure metal or an alloy of metals, for example chosen from zinc, nickel, tin and brass. In this other variant, one of the chemical isolation layers may coat the conduction layer directly or else an intermediate layer is interposed between the conduction layer and this chemical isolation layer;

in one embodiment, the core is coated with an electromagnetic-signal conduction/chemical isolation layer intended for chemically isolating the rubber from what the chemical isolation layer coats, the conduction/chemical isolation layer being made of an alloy of metals, preferably brass;

the core is coated directly with the conduction/chemical isolation layer. As a variant, the core could be coated with one or more intermediate layers interposed between the core and the conduction/chemical isolation layer. In another variant, the bare core could be coated with several conduction/chemical isolation layers, each conduction/chemical isolation layer being made of an alloy of metals, preferably brass. In this other variant, one of the conduction/chemical isolation layers may directly coat the core or else an intermediate layer is interposed between the bare core and this conduction/chemical isolation layer;

the chemical isolation layer or the conduction/chemical isolation layer is coated with an external adhesion layer for adhesion of the antenna to the rubber. The adhesion layer makes it easier to manufacture the tyre. This is because, upon placing the antenna on the rubber compound, the adhesion layer keeps the antenna in place on the rubber compound, with no risk of the antenna slipping;

in one embodiment, the external adhesion layer is made of at least one substantially pure metal or an alloy of metals, for example chosen from zinc, nickel and brass. These metals enable the antenna to adhere to the surrounding rubber;

in another embodiment, the external adhesion layer comprises a non-metallic adhesive;

preferably, the chemical isolation layer or the conduction/chemical isolation layer is coated directly with the adhesion layer. As a variant, the chemical isolation layer or the conduction/chemical isolation layer could be coated with one or more intermediate layers interposed between the chemical isolation layer or the conduction/chemical isolation layer and the adhesion layer. In another variant, the chemical isolation layer or the conduction/chemical isolation layer may be coated with several adhesion layers, each adhesion layer being made of at least one substantially pure metal or an alloy of metals, for example chosen from zinc, nickel and brass, or comprising a non-metallic adhesive. In this other variant, one of the adhesion layers may coat the chemical isolation layer or the conduction/chemical isolation layer directly or else an intermediate layer is interposed between the chemical isolation layer or the conduction/chemical isolation layer and this adhesion layer; and advantageously, after the coating step or steps, the antenna undergoes a heat treatment, by heating it. This promotes metal migration from the conduction layer into the chemical isolation layer. If the conduction layer is made of a substantially pure first metal and the chemical isolation layer is made of a substantially pure second metal, the migration of the first metal to the second layer causes an alloy to form on the surface. Thus, without having to employ an alloy coating step, and therefore without the drawbacks associated with coating an alloy, an antenna with the core protected by an alloy is obtained. If the first and second metals are copper and zinc respectively, brass is therefore formed on the surface. Furthermore, this heat treatment step helps to relieve the stresses built up in the antenna during the plastic deformation step.

BRIEF DESCRIPTION OF THE DRAWINGS

The invention will be better understood on reading the following description, given solely by way of non-limiting example and in conjunction with the drawings in which:

FIGS. 3 to 6 are perspective views with a cross section of the antenna of FIG. 2 during various steps of the manufacturing process according to the first method of implementing the invention;

FIG. 7 is a view similar to that of FIG. 1 during a process step following that of FIGS. 3 to 6;

FIG. 8 is a diagram illustrating various steps of the process according to the first method of implementing the invention;

DETAILED DESCRIPTION OF THE INVENTION

Figure 1:
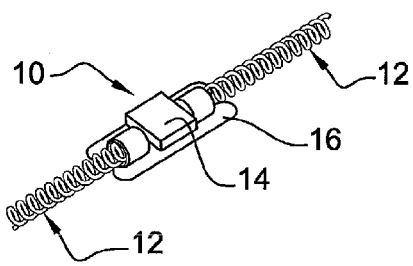
FIG. 1 is a perspective view of an electronic device comprising an antenna manufactured according to a process according to a first embodiment of the invention.
Figure 2:
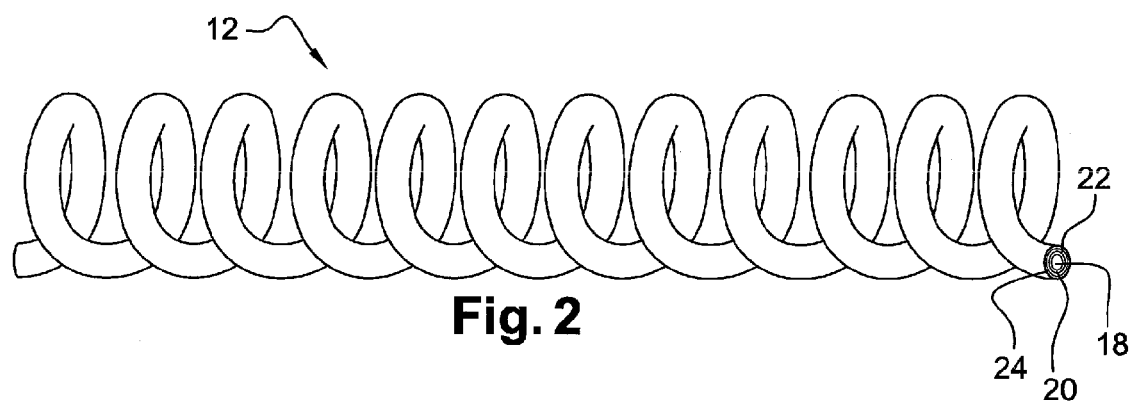
FIG. 2 is a detailed view of the antenna of FIG. 1.

FIG. 1 shows an electronic device denoted by the general reference 10 and intended to be embedded in a rubber compound. In the example shown, the electronic device 10 is of the RFID type and comprises two antennas 12 connected to an electronic member 14, here a chip, said electronic member being mounted on a support plate 16. In what follows, since the two antennas 12 are identical, only one antenna 12 will be described with reference to FIG. 2. The two antennas 12 together form a dipole antenna.

The antenna 12 has a substantially filiform helical shape and a length, an outside diameter and a helix pitch that are defined according to the conditions under which the electronic device is used. To give an example, the pitch of the helix may be 13 turns per centimetre, the outside diameter may be 1.2 mm and the length may be around 25 mm. This combination of characteristics is particularly useful in the case of the electronic device operating in a tyre at UHF frequencies.

The antenna 12 comprises a steel core 18 having an outside diameter of 0.2 mm. The antenna 12 also includes a first layer 20 for conducting an electromagnetic signal which coats the core 18 directly. The conduction layer 20 is made of a substantially pure metal, in the present case metallic copper (chosen for its electrical characteristics and its cost) and is in contact with the core 18. The layer 20 has a thickness of greater than 2 microns, preferably between 4 and 5 microns.

The antenna 12 also includes a second, chemical isolation layer 22 intended for chemically isolating the rubber of the conduction layer 20. The layer 22 coats the first layer 20 directly. The layer 22 is made of substantially pure metal, in this case metallic zinc, and is in contact with the first layer 20. The layer 22 has a thickness of greater than 0.2 microns, preferably between 0.4 and 0.6 microns.

As a variant, the layer 22 is made of nickel or tin.

In another variant, the layer 22 is made of an alloy of metals, for example brass.

In other variants, the antenna 12 comprises several chemical isolation layers 22, each layer being made of a different substantially pure metal or an alloy of metals.

The antenna 12 also includes a third, adhesion layer 24 for adhesion of the antenna to the rubber, said layer coating the second layer 22 directly. The layer 24 comprises a non-metallic adhesive, in this case an adhesive sold under the brand name "Chemlok" or the brand name "Chemosil" by Lord Corporation, and is in contact with the second layer 22.

As a variant, the third layer is made of a substantially pure metal or an alloy of metals, for example chosen from zinc, nickel and brass.

The various steps of the process for manufacturing the antenna 12 according to the first embodiment will now be described with reference to FIGS. 3 to 8.

The process starts by a filiform metal wire comprising the core 18 being wound onto a reel. This bare filiform core 18 is shown in FIG. 3.

During a first cleaning step 100, the core 18 is made to pass through an alkaline bath.

During a step 102, the core 18 is coated directly with the first conduction layer 20 by continuous electrode deposition. The wire is run through a bath of the type suitable for the deposited metal, namely a cyanide bath in the case of copper deposition, an alkaline bath for zinc deposition or an acid bath for tin deposition. This results in the core 18 coated with the layer 20 as shown in FIG. 4.

Next, during a step 104, the first layer 20 is coated directly with the second, chemical isolation layer 22, again by passage through an electrolysis bath of composition appropriate to the material of the chemical isolation layer. This results in the core 18 coated with the layers 20, 22, as shown in FIG. 5.

Next, during a step 106, the second layer 22 is coated directly with the third, adhesion layer 24. This results in the core being coated with the layers 20, 22, 24, as shown in FIG. 6. In the variant in which the third layer is made of a substantially pure metal or an alloy of metals, the third layer is deposited by a "flash" process, which corresponds to a relatively short electro-deposition process enabling a third layer having a thickness of less than 0.1 microns to be obtained. Such a "flash" process uses a high current density and a bath with a low ionic concentration.

Next, during a step 108, the core 18 coated with the layers 20, 22 and 24 is cleaned (removal of the residues from the deposition bath, followed by rinsing) and then dried by passing a stream of hot clean air over it.

In a step 110, the composition of each layer 20, 22, 24 is checked, for example by X-ray fluorescence spectroscopy or by polarography. The thickness of each layer 20, 22, 24 is also checked, for example by scanning electron microscopy, polarography or ICP-AES (inductively coupled plasma-atomic emission spectroscopy). The surface appearance of the antenna 12 is also checked so as to verify the uniformity of the deposit. A test to characterize the mechanical endurance potential of the core and of the adhesion of the coating layers may also be carried out.

Next, during a step 112, the coated filiform core is plastically deformed so as to give it its helical shape by means of a spring winding lathe. In this case, the core coated with the layers 20, 22 and 24 is continuously deformed plastically over its entire length. What is then obtained is the core coated with the layers 20, 22 and 24, as shown in FIG. 7.

As a variant, only one portion of the core coated with the layers 20, 22 and 24 is plastically deformed periodically along the core coated with the layers 20, 22 and 24.

Next, during a step 114, the coated helical core 18 is cut into sections 24 of predetermined length, here around 20 to 30 millimetres.

Next, during a step 116, the antenna 12 is heat-treated by heating it at a temperature of at least 200° C. for 30 minutes in order to relax the mechanical stresses. What is then obtained is the helical antenna 12 shown in FIG. 2.

Finally, during a step 118, the antenna 12 is connected to a terminal of the electronic member 14 and to the support plate 16 in order to obtain the device 10 shown in FIG. 1.

Figure 9:
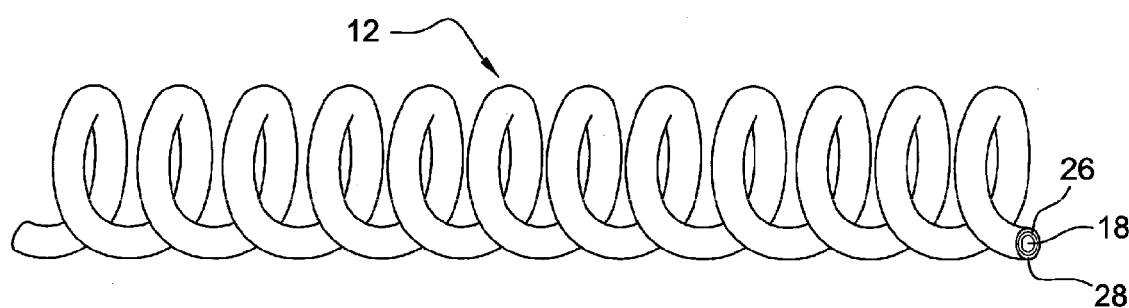
FIG. 9 is a view similar to that of FIG. 2, showing a second embodiment of an antenna according to the invention.
Figure 10:
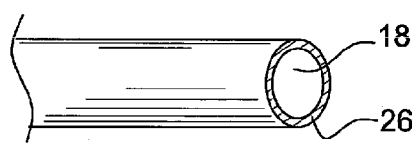
FIGS. 10 and 11 are views similar to FIGS. 4 to 6 of an antenna manufactured by a process according to the second method of implementing the invention.
Figure 11:
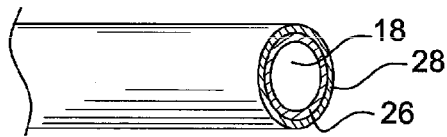

FIGS. 9 to 11 illustrate an antenna according to a second embodiment of the invention and a process according to a second method of implementing the invention. The elements similar to those of the antenna and the process of the first embodiment are denoted by identical references.

Unlike the first embodiment, the antenna 12 comprises a conduction/chemical isolation layer 26 made of an alloy of metal. In this case, the alloy is brass. The layer 26 coats the core 18 of the antenna directly. The antenna 12 also includes an adhesion layer 28 similar to that of the antenna 12 according to the first embodiment.

The various steps of the manufacturing process according to the second embodiment will now be described with reference to FIGS. 10 and 11.

The process according to the second embodiment differs from the process according to the first embodiment by steps 102 and 104. This is because, after the cleaning step 100, the core 18 is coated directly with the brass conduction/chemical isolation layer 26. The core 18 coated with the layer 26 shown in FIG. 10 is then obtained.

Next, the layer 26 is coated directly with the adhesion layer 28. The core coated with the layers 26 and 28 as shown in FIG. 11 is then obtained.

The invention is not limited to the embodiment or the method of implementation described above.

This is because it would be possible to deform the coated core in its entirety or else only a portion thereof. Furthermore, several portions of the coated core could be plastically deformed in different ways.

The coating steps using metals or alloys are generally carried out in electrolysis baths. As a variant, they could be carried out using other known techniques.

The invention claimed is:

1. A process for manufacturing an antenna, which includes a core and which is intended to be integrated into a rubber compound, the process comprising steps of:
    coating the core with a coating made of a material different from a material of the core, wherein the core has a filiform shape; and,
    after the coating step, plastically deforming the coated core,
    wherein the step of coating the core includes directly coating the core with an electromagnetic-signal conduction layer.

2. The process according to claim 1, wherein the core is made of steel.

3. The process according to claim 1, wherein the step of plastically deforming the portion of the coated core includes deforming the coated core to have a helicoidal shape.

4. The process according to claim 1, wherein the conduction layer is made of a substantially pure metal.

5. The process according to claim 1, wherein the conduction layer is made of copper.

6. The process according to claim 1, wherein the step of coating the core includes coating the core with a chemical isolation layer intended to chemically isolate the rubber compound from an object coated by the isolation layer.

7. The process according to claim 6, wherein the step of coating the core includes coating the core with an electromagnetic-signal conduction layer, with the isolation layer directly coating the conduction layer.

8. The process according to claim 6, wherein the isolation layer is made of a substantially pure metal or a metal alloy chosen from: zinc, nickel, tin, and brass.

9. The process according to claim 6, further comprising a step of coating the isolation layer with an external adhesion layer for promoting adhesion of the antenna to the rubber compound.

10. The process according to claim 9, wherein the external adhesion layer is made of at least one substantially pure metal or a metal alloy chosen from: zinc, nickel, and brass.

11. The process according to claim 9, wherein the external adhesion layer includes a non-metallic adhesive material.

12. The process according to claim 9, wherein the step of coating the isolation layer includes directly coating the isolation layer with the adhesion layer.

13. The process according to claim 1, wherein the step of coating the core includes coating the core with an electromagnetic-signal conduction/chemical isolation layer formed of a metal alloy.

14. The process according to claim 13, wherein the metal alloy is brass.

15. The process according to claim 13, wherein the step of coating the core includes directly coating the core with the electromagnetic-signal conduction/chemical isolation layer.

16. The process according to claim 13, further comprising a step of coating the electromagnetic-signal conduction/chemical isolation layer is coated with an external adhesion layer for promoting adhesion of the antenna to the rubber compound.

17. The process according to claim 16, wherein the external adhesion layer is made of at least one substantially pure metal or a metal alloy chosen from: zinc, nickel, and brass.

18. The process according to claim 16, wherein the external adhesion layer includes a non-metallic adhesive material.

19. The process according to claim 16, wherein the step of coating the electromagnetic-signal conduction/chemical isolation layer includes directly coating the electromagnetic-signal conduction/chemical isolation layer with the adhesion layer.

20. The process according to claim 1, further comprising a step of, after the coating of the core, heating the antenna to perform a heat treatment.

* * * * *